US010324779B1

(12) United States Patent
Bellingan et al.

(10) Patent No.: US 10,324,779 B1
(45) Date of Patent: Jun. 18, 2019

(54) USING UNSUPERVISED LEARNING TO MONITOR CHANGES IN FLEET BEHAVIOR

(71) Applicant: Amazon Technologies, Inc., Reno, NV (US)

(72) Inventors: Carl Bellingan, Western Cape (ZA); Atle Jorgensen, Western Cape (ZA)

(73) Assignee: Amazon Technologies, Inc., Reno, NV (US)

(*) Notice: Subject to any disclaimer, the term of this patent is extended or adjusted under 35 U.S.C. 154(b) by 5 days.

(21) Appl. No.: 13/924,035

(22) Filed: Jun. 21, 2013

(51) Int. Cl.
*G06F 11/00* (2006.01)
*G06F 11/07* (2006.01)

(52) U.S. Cl.
CPC ................................ *G06F 11/0751* (2013.01)

(58) Field of Classification Search
CPC ........................................................ G06F 15/18
USPC ....................... 705/7; 709/219, 224; 717/114
See application file for complete search history.

(56) References Cited

U.S. PATENT DOCUMENTS 5,465,321 A 11/1995 Smyth
6,868,325 B2 3/2005 Menon et al.
7,480,640 B1 1/2009 Elat et al.
7,526,409 B2 * 4/2009 Ramacher ......... G06F 17/30306 340/500
7,561,991 B2 7/2009 Matsunaga et al.
7,865,089 B2 1/2011 Andreoli et al.
7,885,842 B1 * 2/2011 Bartolini et al. ............. 709/226
8,108,250 B1 * 1/2012 Moore et al. ................ 705/7.42
8,136,154 B2 3/2012 Phoha et al.
8,577,663 B2 11/2013 Lu et al.
8,625,757 B1 1/2014 Karpov et al.
8,909,562 B2 12/2014 Bhatnagar et al.
8,959,633 B1 * 2/2015 Dokey .................... G06F 21/50 705/30
9,231,963 B2 * 1/2016 Dokey .................... G06F 21/50
2002/0116545 A1 * 8/2002 Mandato et al. ............. 709/328
2003/0036886 A1 * 2/2003 Stone .................. G06F 11/0715 702/188
2003/0105993 A1 * 6/2003 Colrain ................. G06F 9/5061 714/39
2003/0117279 A1 6/2003 Ueno et al.
2004/0113933 A1 6/2004 Guler
2005/0010456 A1 * 1/2005 Chang et al. ...................... 705/7
2005/0033481 A1 * 2/2005 Budhraja ................ H02J 3/008 700/286
2005/0120111 A1 * 6/2005 Bailey et al. ................. 709/224

(Continued)

OTHER PUBLICATIONS

U.S. Appl. No. 13/924,013, filed Jun. 21, 2013, Bellingan et al.

(Continued)

*Primary Examiner* — Bryce P Bonzo
*Assistant Examiner* — Jeison C Arcos
(74) *Attorney, Agent, or Firm* — Baker & Hostetler LLP

(57) ABSTRACT

Embodiments are disclosed for determining whether a computing node is in a normal or an abnormal condition based on its characteristics relative to those of other computing nodes. In embodiments, log files for the computing node are used to develop a state model of the computing node, and where the state model differs between two similar computing nodes, an abnormality is identified. In other embodiments, characteristics about computing nodes (e.g., CPU resources used) are used to cluster those computing nodes, and those computing nodes that lie outside of a cluster are identified as abnormal.

24 Claims, 10 Drawing Sheets

Start 502
Predetermined states? 504
Yes
No
Add states to state diagram 506
Data on host? 508
Yes
No
Set host data 510
Data off host? 512
Yes
No
Get off-host data 514
New states based on data? 516
Yes
No
Add new states to diagram 518
Add transitions to diagram 520
Add time states to diagram 522
End 524

(56) References Cited

U.S. PATENT DOCUMENTS

2005/0216241 A1 9/2005 Entin et al.
2005/0223020 A1* 10/2005 Cutlip et al. .................. 707/102
2005/0228795 A1* 10/2005 Shuster ................. G06F 21/564
2006/0179106 A1* 8/2006 Turner .................. G06F 9/5072 709/201
2007/0011330 A1* 1/2007 Dinker ................ G06F 11/3409 709/226
2007/0061626 A1* 3/2007 Nelson ................ G06F 11/3688 714/38.14
2007/0083564 A1* 4/2007 Ramacher ......... G06F 17/30306
2007/0083639 A1* 4/2007 Gilbert et al. ................ 709/224
2008/0126858 A1* 5/2008 Barras ................... G06F 11/327 714/25
2008/0195723 A1* 8/2008 Bantz et al. .................. 709/219
2009/0064104 A1* 3/2009 Baeyens et al. .............. 717/114
2009/0192842 A1* 7/2009 Grabarnik et al. ............... 705/7
2009/0199196 A1* 8/2009 Peracha .............. G06F 11/3409 718/104
2009/0319905 A1* 12/2009 Loeb ...................... G06Q 10/06 715/736
2010/0100250 A1* 4/2010 Budhraja ................ H02J 3/008 700/291
2011/0029981 A1* 2/2011 Jaisinghani ................... 718/104
2011/0214006 A1 9/2011 Meek et al.
2012/0022707 A1* 1/2012 Budhraja ................ H02J 3/008 700/292
2012/0185728 A1 7/2012 Guo et al.
2012/0266026 A1* 10/2012 Chikkalingaiah et al. .. 714/38.1
2012/0324112 A1* 12/2012 Dow ..................... G06F 9/5033 709/226
2012/0324445 A1* 12/2012 Dow ................... G06F 9/45504 718/1
2013/0132561 A1* 5/2013 Pasala et al. ................. 709/224
2013/0339515 A1* 12/2013 Radhakrishnan ..... H04L 41/142 709/224
2014/0047096 A1* 2/2014 Kupershmidt ..... G06Q 10/0631 709/224
2014/0068341 A1* 3/2014 Martineau et al. ........ 714/38.11
2015/0120914 A1* 4/2015 Wada .................. H04L 43/0882 709/224
2015/0135312 A1* 5/2015 Wada .................. G06F 11/3495 726/22

OTHER PUBLICATIONS

Wang et al.; "Statistical Techniques for Online Anomaly Detection in Data Centers"; HP Laboratories; HPL-2011-8; May 2011; 9 pages.

* cited by examiner

USING UNSUPERVISED LEARNING TO MONITOR CHANGES IN FLEET BEHAVIOR

CROSS REFERENCE TO RELATED APPLICATIONS

This application is related by subject matter to the following commonly assigned application: U.S. patent application Ser. No. 13/924,013, entitled "MARKOV MODELING OF HOST STATE FROM LOG FILES," filed on Jun. 21, 2013, the entirety of which is hereby incorporated by reference.

BACKGROUND

There are ways to determine that a computer system is in an abnormal condition. If a computer system reaches an error condition, for instance, because its hard disk crashed, that system may produce an error alert that may inform another computer system or an administrator that the error has occurred. A computer system may also produce a log file of its activities, and the information stored in the log file may be analyzed to determine that the computer system is in an error condition.

DETAILED DESCRIPTION

Figure 1:
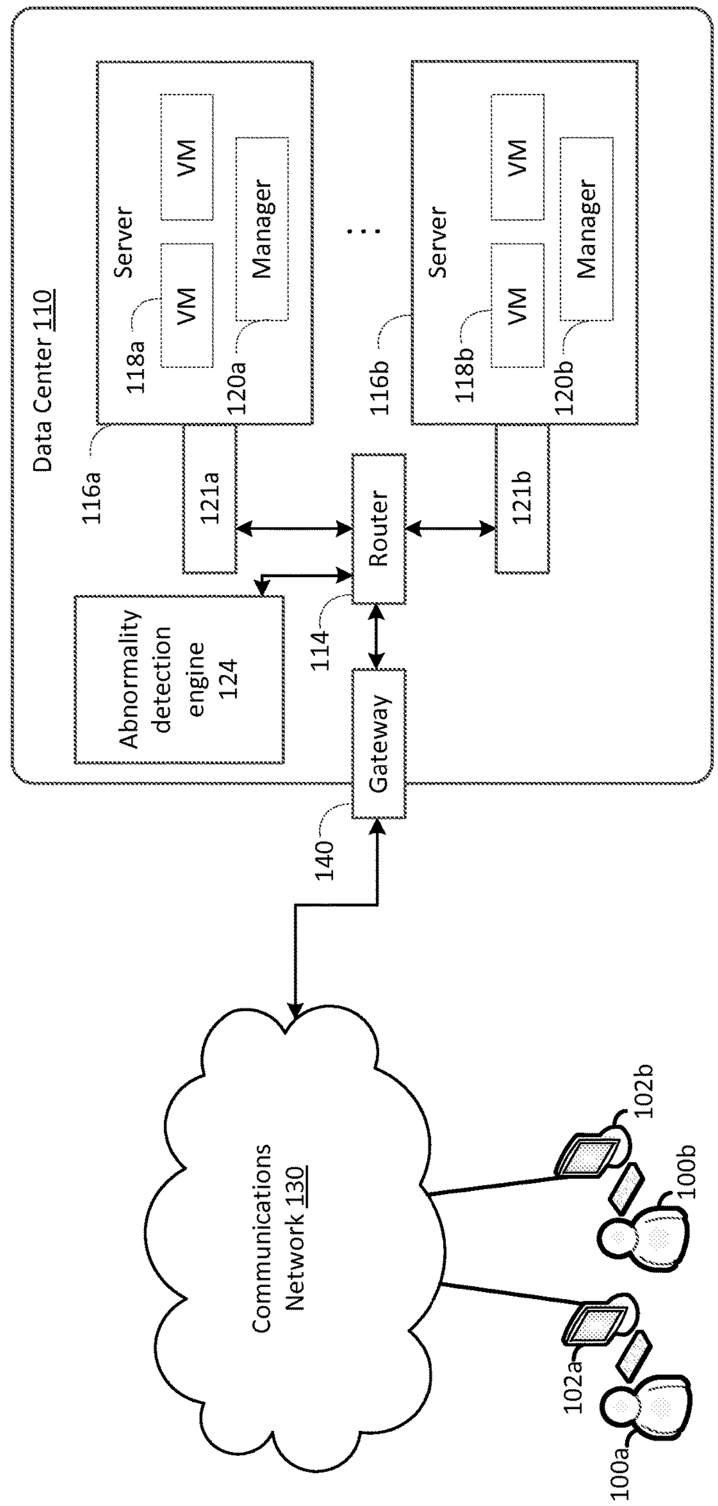
FIG. 1 illustrates an example computing environment in which embodiments described herein may be implemented.

Where the above techniques may be used to determine that a computer system is in an error condition, they may be inefficient. Additionally, the above techniques may not be able to detect when a computer system is in an abnormal condition that does not rise to the level of being a flow-blown error condition. Embodiments disclosed herein may be used to more efficiently determine whether a computing node is in an error condition and also to determine when a computing node is in an abnormal condition. Embodiments include both the use of a Markov model and clustering. Embodiments that use clustering may be a more general case of using unsupervised learning techniques to figure out what is normal for a particular state, while embodiments that use a Markov model may be a more specific implementation of that.

Embodiments are based on building a Markov model for a computing node's state. A Markov model is a form of a state model—a mathematical system that expresses these distributions and the probability that these distributions will transition from one type of operation to another (e.g., from a random read to a random write). In particular, this Markov model may be a hidden Markov chain—a mathematical model that contains transitions between multiple states. The next state depends on the current state alone and not on any previous state that has been encountered. Since the next state depends on the current state alone, the Markov chain may be considered to be memory-less. Additionally, this Markov model may be hidden because the state is not entirely observable. Observations about the system may give information about the system without indicating entirely which state the system is currently in.

In embodiments that use a Markov model, the Markov model may be developed based on information stored in log files. A computing node typically logs events in log files. This logged information may include information about the success or failure of launching a virtual machine (VM) instance or a load of the computing node. A Markov model for a computing node may also be developed based on information stored in log files that are kept on a different computing node. For example, launching a VM instance may involve creating a virtual domain or attaching a network-accessible block storage device to the instance.

The Markov model may be produced from these log files such that it indicates the states that a computing node may be in, a probability of transitioning from one state to another state and an expected time spent in a state. Then, additional log files generated with respect to this computing node or another computing mode may be analyzed. In embodiments, these additional log files may be analyzed to update the Markov model, as for example, the probabilities of particular state transitions may change over time, even though these new probabilities represent normal operation of the computing node. In other embodiments, these additional log files may be analyzed to produce a new Markov model that represents how the computing node is currently operating; and where this new Markov model sufficiently differs from the previously determined Markov model, it may be determined that this computing node is in an abnormal condition.

Other embodiments are based on clustering the state of computing nodes and determining that a computing node is in an abnormal condition because it deviates from that cluster. In clustering, a set of objects may be grouped in such a way that objects in the same group (sometimes referred to as a cluster) are more similar (in possibly different senses, depending on the embodiment) to each other than to those objects outside of that group or cluster. These clustering techniques may be performed on characteristics of computing nodes, such as load, memory usage and disk I/O (input/output) based on how that information is stored in log files, as described above.

The embodiments described herein mainly deal with computing nodes (which may be, in embodiments, virtual machine instances, physical computing devices, routers or switches, datacenters, or platforms for web services that comprise one or more datacenters). It may be appreciated that these techniques may be applied to different levels of granularity—e.g. embodiments may be used to compare instances, physical computing devices, etc., against each other, or against the same thing at a different time. Where these techniques are described as being applied at the service level, it may be appreciated that the techniques may be applied to the service as a whole, or to subsets of the platform that the service runs on (e.g., various computing devices within the platform).

Embodiments may also be used for placement. When a host has a high variance of load (e.g., a mean load of 0.5 with a variance of 0.4), this may be identified and used as an indication of abnormal condition. So, even though the host may have sufficient available load to host another instance, a new instance may be placed with a different host because of this host's variance. A host that identifies itself as having an abnormal condition using the techniques described herein may identify an instance placement manager of its high variance, so that the instance placement manager may use that information in determining where to place a new instance among a plurality of hosts.

An example of how these techniques may be used to determine that computing nodes are in an abnormal condition is as follows. It may be that instances with a large type (as opposed to medium, small or micro) are impaired due to a load at a specific time of the day. A Markov model that is generated based on these instances' log files may identify the non-impaired state as the normal condition, and then identify the impaired state as the abnormal condition because a Markov model built from the instances in the impaired state will differ from a Markov model built from the instances in a non-impaired state. Similarly, clustering may identify the instances when they are in the impaired state as having an abnormal condition because most instances are clustered around particular load values, while the instances in an impaired state have outlying load values.

FIG. 1 illustrates an example computing environment in which the embodiments described herein may be implemented. For example, embodiments utilizing Markov model or clustering techniques may be used to determine whether the condition of servers 116*a* and 116*b* is normal or abnormal. These techniques may also be applied to virtual machine instances 118*a* and 118*b*, or portions of data center 110 that are greater than servers 116*a* and 116*b*. These techniques may be used to compare virtual machine instances or servers within a particular data center or availability zone (an availability zone being described with more detail with respect to FIG. 2), or to compare virtual machine instances or servers across multiple data centers or availability zones. Other levels of granularity may also be used in the embodiments described herein. For example, where servers 116*a* and 116*b* are physically located on a rack, these embodiments may be used to determine the condition of the rack as a whole (such as where the servers on one rack share network bandwidth, and it may be determined that the amount of network I/O on the rack is abnormal).

Log files stored on various components depicted in FIG. 1 may be used to determine data for used in the Markov model and/or clustering embodiments described herein. Where these Markov model and/or clustering embodiments are performed at the server or virtual machine instance level, data in log files stored there may be considered to be on-host. Furthermore, these Markov model and/or clustering embodiments are performed at the server or virtual machine instance level, data in log files stored in router 114, network cards 121*a* or 121*b*, or gateway 140 (or data stored in log files on a different server or virtual machine) may be considered to be off-host. In embodiments, both on-host and off-host data is used in the Markov model and/or clustering embodiments described herein.

In embodiments, this on-host and off-host data that is stored in log files may be collected in a database and analyzed. As depicted, abnormality detection engine 124 may collect and store this information in a database, and then query this database for that information in the course of performing the Markov model and/or clustering embodiments. Abnormality detection engine 124 may perform the Markov model and/or clustering embodiments to analyze one or more virtual machine instances 118, servers 116, or other devices within data center 110, or data center 110 itself, to determine whether the thing being analyzed is in a normal or abnormal condition. In embodiments where data center 110 is part of a service that runs on a web services platform that comprises multiple data centers, abnormality detection engine 124 may be located, for example, within one of these data centers, or on a computing node outside of the platform. In other embodiments, abnormality detection engine 124 may be implemented in one of servers 116, such as on one of virtual machine instances 118.

As used herein, a service platform may comprise one or more data centers 110 of FIG. 1, and a service (or computing service) may be functionality provided by the service platform to customers. A service platform may be a collection of one or more data centers or computing nodes that run software that provides a function to multiple customers through an application programming interface (API). An example function of a service is to provide customers with compute resources, such as in the form of virtual machine instances 118 of FIG. 1. A customer, such as user 100*a*, may use computer 102*a* to send an API call to a service platform across communications network 130, and this API call may indicate, e.g., to instantiate, terminate, or otherwise manipulate a virtual machine instance 118 within a data center 110 of the service platform. This virtual machine instance 118 may then perform a role of the service for the customer, such as performing the role of a web server for the customer's business.

FIG. 1 is a diagram schematically illustrating an example of a data center 110 that can provide computing resources to users 100*a* and 100*b* (which may be referred herein singularly as "a user 100" or in the plural as "the users 100") via user computers 102*a* and 102*b* (which may be referred herein singularly as "a computer 102" or in the plural as "the computers 102") via a communications network 130. Data center 110 may be configured to provide computing resources for executing applications on a permanent or an as-needed basis. The computing resources provided by data center 110 may include various types of resources, such as data processing resources, data storage resources, data communication resources and the like. Each type of computing resource may be general-purpose or may be available in a number of specific configurations. For example, data processing resources may be available as virtual machine instances. The instances may be configured to execute applications, including Web servers, application servers, media servers, database servers and the like. Data storage resources may include file storage devices, block storage devices and the like.

Each type or configuration of computing resource may be available in different sizes, such as large resources, consisting of many processors, large amounts of memory and/or large storage capacity, and small resources consisting of fewer processors, smaller amounts of memory and/or smaller storage capacity. Customers may choose to allocate a number of small processing resources as Web servers and/or one large processing resource as a database server, for example.

Data center 110 may include servers 116*a* and 116*b* (which may be referred herein singularly as "a server 116" or in the plural as "the servers 116") that provide computing resources available as virtual machine instances 118*a* and 118*b* (which may be referred herein singularly as "a virtual machine instance 118" or in the plural as "the virtual machine instances 118"). The virtual machine instances 118 may be configured to execute applications, including Web servers, application servers, media servers, database servers and the like. Other resources that may be provided include data storage resources (not shown) and may include file storage devices, block storage devices and the like.

The availability of virtualization technologies for computing hardware has provided benefits for providing large scale computing resources for customers and allowing computing resources to be efficiently and securely shared between multiple customers. For example, virtualization technologies such as those provided by VMware or other virtualization systems may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that spans multiple distinct physical computing systems.

Referring to FIG. 1, communications network 130 may, for example, be a publicly accessible network of linked networks and possibly operated by various distinct parties, such as the Internet. In other embodiments, communications network 130 may be a private network, such as, for example, a corporate or university network that is wholly or partially inaccessible to non-privileged users. In still other embodiments, communications network 130 may include one or more private networks with access to and/or from the Internet.

Communication network 130 may provide access to computers 102. Computers 102 may be computers utilized by users 304 100 or other customers of data center 110. For instance, user computer 102*a* or 102*b* may be a server, a desktop or laptop personal computer, a tablet computer, a wireless telephone, a personal digital assistant (PDA), an e-book reader, a game console, a set-top box or any other computing device capable of accessing data center 110. User computer 102*a* or 102*b* may connect directly to the Internet (e.g., via a cable modem or a Digital Subscriber Line (DSL)). Although only two user computers 102*a* and 102*b* are depicted, it should be appreciated that there may be multiple user computers.

Computers 102 may also be utilized to configure aspects of the computing resources provided by data center 110. In this regard, data center 110 might provide a Web interface through which aspects of its operation may be configured through the use of a Web browser application program executing on user computer 102. Alternatively, a stand-alone application program executing on user computer 102 might access an application programming interface (API) exposed by data center 110 for performing the configuration operations. Other mechanisms for configuring the operation of the data center 110, including deploying updates to an application, might also be utilized.

Servers 116*a* and 116*b* shown in FIG. 1 may be standard servers configured appropriately for providing the computing resources described above and may provide computing resources for executing one or more applications. In one embodiment, the computing resources may be virtual machine instances 118. In the example of virtual machine instances, each of the servers 116 may be configured to execute an instance manager 120*a* or 120*b* (which may be referred herein singularly as "an instance manager 120" or in the plural as "the instance managers 120") capable of executing the virtual machine instances. The instance managers 120 may be a virtual machine monitor (VMM) or another type of program configured to enable the execution of virtual machine instances 118 on servers 116, for example. As discussed above, each of the virtual machine instances 118 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 110 shown in FIG. 1, a router 114 may be utilized to interconnect the servers 116*a* and 116*b*. Router 114 may also be connected to gateway 140, which is connected to communications network 130. Router 114 may manage communications within networks in data center 110, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices in this example are illustrated without showing certain conventional details. Additional computing systems and other devices may be interconnected in other embodiments and may be interconnected in different ways.

It should be appreciated that the network topology illustrated in FIG. 1 has been greatly simplified and that many more networks and networking devices may be utilized to interconnect the various computing systems disclosed herein. These network topologies and devices should be apparent to those skilled in the art.

It should also be appreciated that data center 110 described in FIG. 1 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

The capacity of the purchased computing resources provided by data center 110 can be scaled in response to demand. In this regard, scaling refers to the process of instantiating (which may also be referred to herein as "launching" or "creating") or terminating (which may also be referred to herein as "de-scaling") instances of computing resources in response to demand. In this manner, the capacity of resources purchased by a customer of data center 110 can be scaled on-demand.

Auto scaling is one mechanism for scaling computing resources in response to increases or lulls in demand for the resources. Auto scaling allows customers of data center 110 to configure data center 110 to scale their purchased computing resources according to conditions defined by the customer. For instance, rules may be defined for scaling up capacity in a particular manner in response to the occurrence of specified conditions, such as a spike in demand. Similarly, rules might also be defined to scale down capacity in a particular manner in response to the occurrence of other conditions, such as a lull in demand. The mechanisms disclosed herein for launching virtual machine instances might be utilized when instances are manually launched by a customer or when instances are launched by an auto scaling component in data center 110.

Data center 110 may also be configured with a deployment component to assist customers in the deployment of new instances of computing resources. The deployment component may receive a configuration from a customer that includes data describing how new instances should be configured. For example, the configuration might specify one or more applications or software components that should be installed in new instances, provide scripts and/or other types of code to be executed in new instances, provide cache warming logic specifying how an application cache should be prepared and other types of information. The deployment component utilizes the customer-provided configuration and cache warming logic to launch, configure and prime new instances of computing resources.

Figure 2:
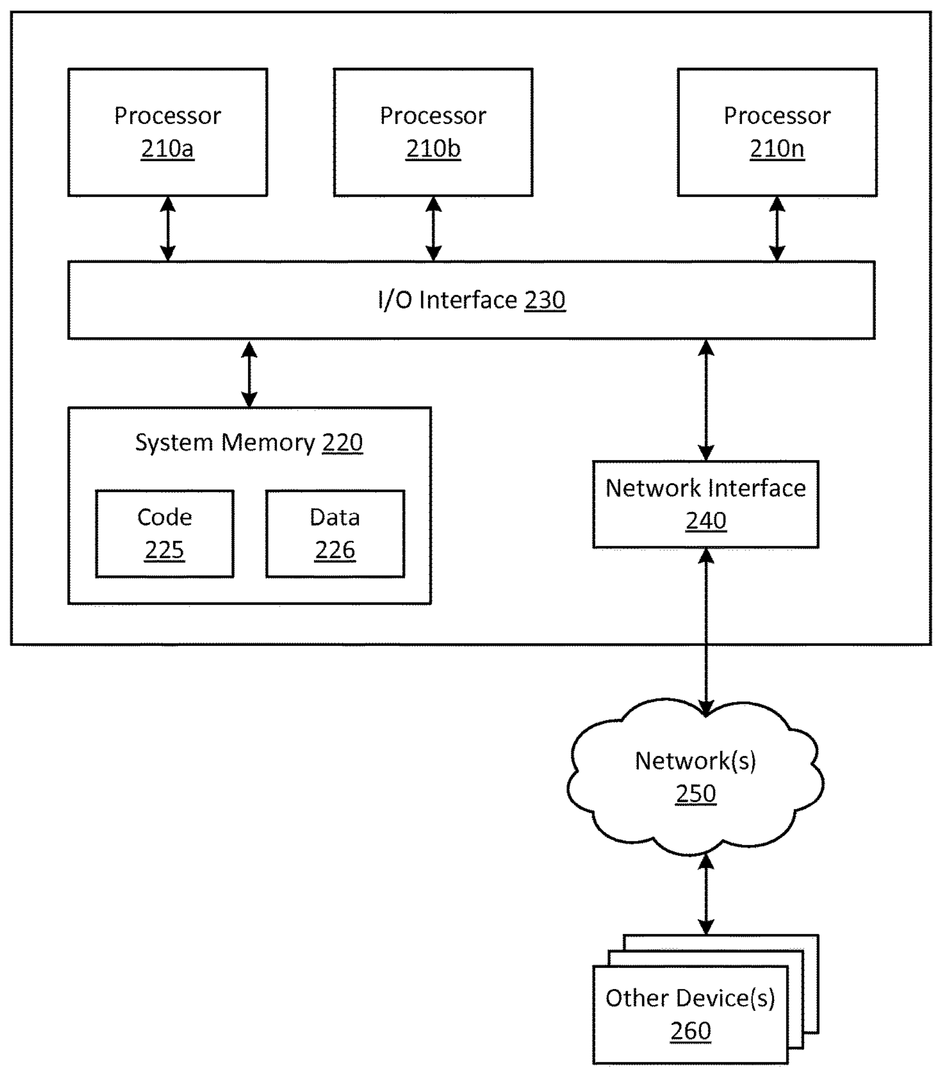
FIG. 2 depicts a general-purpose computer system in which embodiments described herein may be implemented.

Servers 116*a* and 116*b* of FIG. 1 may be implemented using computing device 200 of FIG. 2. FIG. 2 depicts a general-purpose computer system that includes or is configured to access one or more computer-accessible media. In the illustrated embodiment, computing device 200 includes one or more processors 210*a*, 210*b* and/or 210*n* (which may be referred herein singularly as "a processor 210" or in the plural as "the processors 210") coupled to a system memory 220 via an input/output (I/O) interface 230. Computing device 200 further includes a network interface 240 coupled to I/O interface 230.

In various embodiments, computing device 200 may be a uniprocessor system including one processor 210 or a multiprocessor system including several processors 210 (e.g., two, four, eight or another suitable number). Processors 210 may be any suitable processors capable of executing instructions. For example, in various embodiments, processors 210 may be general-purpose or embedded processors implementing any of a variety of instruction set architectures (ISAs), such as the x86, PowerPC, SPARC or MIPS ISAs or any other suitable ISA. In multiprocessor systems, each of processors 210 may commonly, but not necessarily, implement the same ISA.

System memory 220 may be configured to store instructions and data accessible by processor(s) 210. In various embodiments, system memory 220 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 220 as code 225 and data 226.

In one embodiment, I/O interface 230 may be configured to coordinate I/O traffic between processor 210, system memory 220 and any peripheral devices in the device, including network interface 240 or other peripheral interfaces. In some embodiments, I/O interface 230 may perform any necessary protocol, timing or other data transformations to convert data signals from one component (e.g., system memory 220) into a format suitable for use by another component (e.g., processor 210). In some embodiments, I/O interface 230 may include support for devices attached through various types of peripheral buses, such as a variant of the Peripheral Component Interconnect (PCI) bus standard or the Universal Serial Bus (USB) standard, for example. In some embodiments, the function of I/O interface 230 may be split into two or more separate components, such as a north bridge and a south bridge, for example. Also, in some embodiments some or all of the functionality of I/O interface 230, such as an interface to system memory 220, may be incorporated directly into processor 210.

Network interface 240 may be configured to allow data to be exchanged between computing device 200 and other device or devices 260 attached to a network or networks 250, such as other computer systems or devices as illustrated in FIGS. 1 through 2, for example. In various embodiments, network interface 240 may support communication via any suitable wired or wireless general data networks, such as types of Ethernet networks, for example. Additionally, network interface 240 may support communication via telecommunications/telephony networks such as analog voice networks or digital fiber communications networks, via storage area networks such as Fibre Channel SANs or via any other suitable type of network and/or protocol.

In some embodiments, system memory 220 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 200 via I/O interface 230. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 200 as system memory 220 or another type of memory. Further, a computer-accessible medium may include transmission media or signals such as electrical, electromagnetic or digital signals, conveyed via a communication medium such as a network and/or a wireless link, such as may be implemented via network interface 240. Portions or all of multiple computing devices such as those illustrated in FIG. 2 may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A network set up by an entity such as a company or a public sector organization to provide one or more services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and services offered by the provider network. The resources may in some embodiments be offered to clients in units called instances, such as virtual or physical computing instances or storage instances. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a data center or other geographic location of the underlying computing hardware, for example.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone may be even faster).

The provider network may make instances available "on-demand," allowing a customer to select a number of instances of a specific type and configuration (e.g. size, platform, tenancy, availability zone and the like) and quickly launch the instances for deployment. On-demand instances may further be added or removed as needed, either manually or automatically through auto scaling, as demand for or capacity requirements change over time. The customer may incur ongoing usage costs related to their on-demand instances, based on the number of hours of operation and/or the actual resources utilized, for example.

The computing resource provider may also make reserved instances available to the customer. Reserved instances may provide the customer with the ability to reserve a number of a specific type and configuration of instances for a fixed term, such as one year or three years, for a low, upfront cost in exchange for reduced hourly or other usage costs, for example, if and when the instances are launched. This may allow the customer to defer costs related to scaling up the deployed application in response to increase in demand, while ensuring that the right resources will be available when needed. While reserved instances provide customers with reliable, stand-by capacity for scaling of their application, purchasing reserved instances may also lock the customer into a specific number, type and/or configuration of computing resource in a specific availability zone for a longer period than desired. If the technical architecture or needs of the application change, the customer may not be able to realize a return on their investment in the reserved instances.

Operators of such provider networks may in some instances implement a flexible set of resource reservation, control and access interfaces for their clients. For example, a resource manager of the provider network may implement a programmatic resource reservation interface (e.g., via a web site or a set of web pages) that allows clients to learn about, select, purchase access to and/or reserve resource instances. In some embodiments discussed below where an entity such as a resource manager or a pricing optimizer is described as implementing one or more programmatic interfaces such as a web page or an API, an interface manager subcomponent of that entity may be responsible for the interface-related functionality. In many embodiments equivalent interface-related functionality may be implemented by a separate or standalone interface manager, external to the resource manager and the pricing optimizer. Such an interface may include capabilities to allow browsing of a resource catalog, provide details and specifications of the different types or sizes of resources supported, the different reservation types or modes supported, pricing models and so on.

Figure 3:
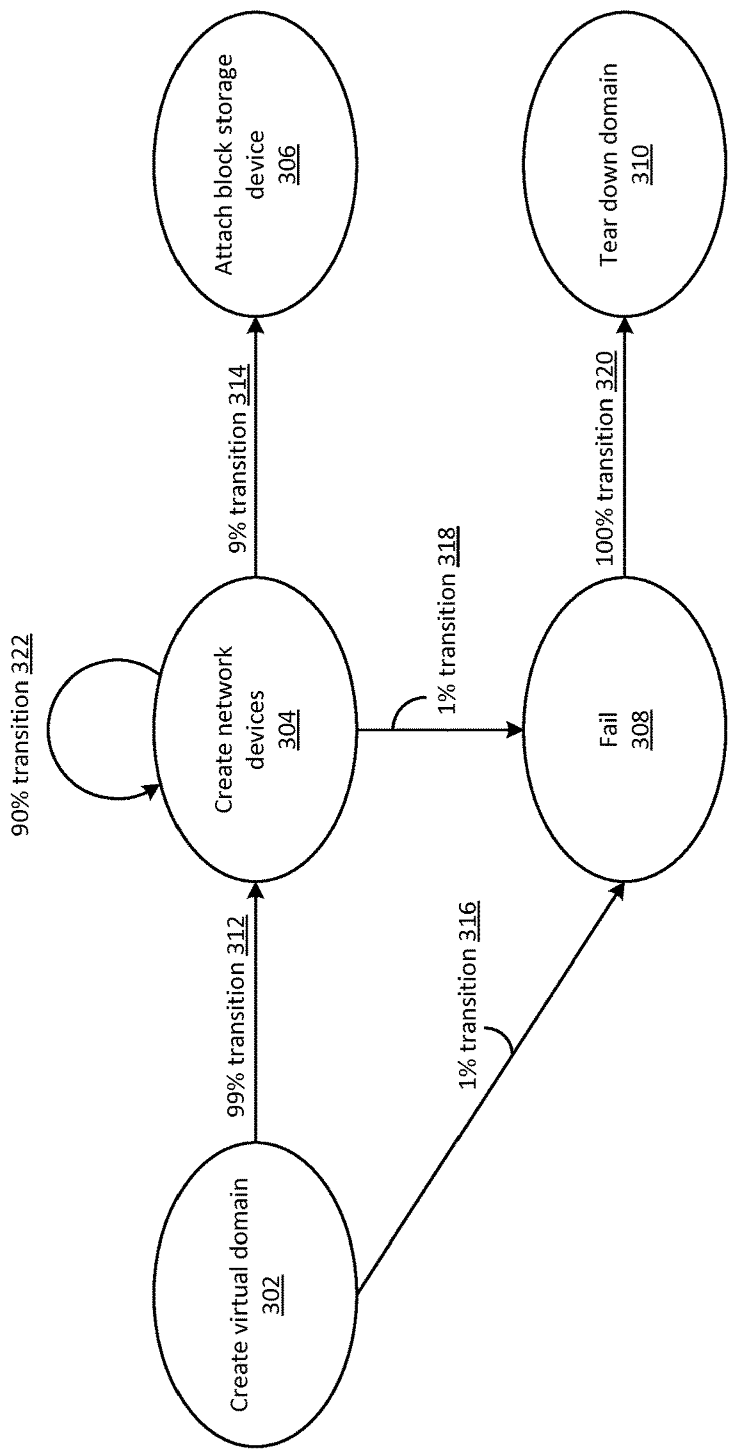
FIG. 3 depicts an example state model that concerns a computing node in a normal condition.
Figure 4:
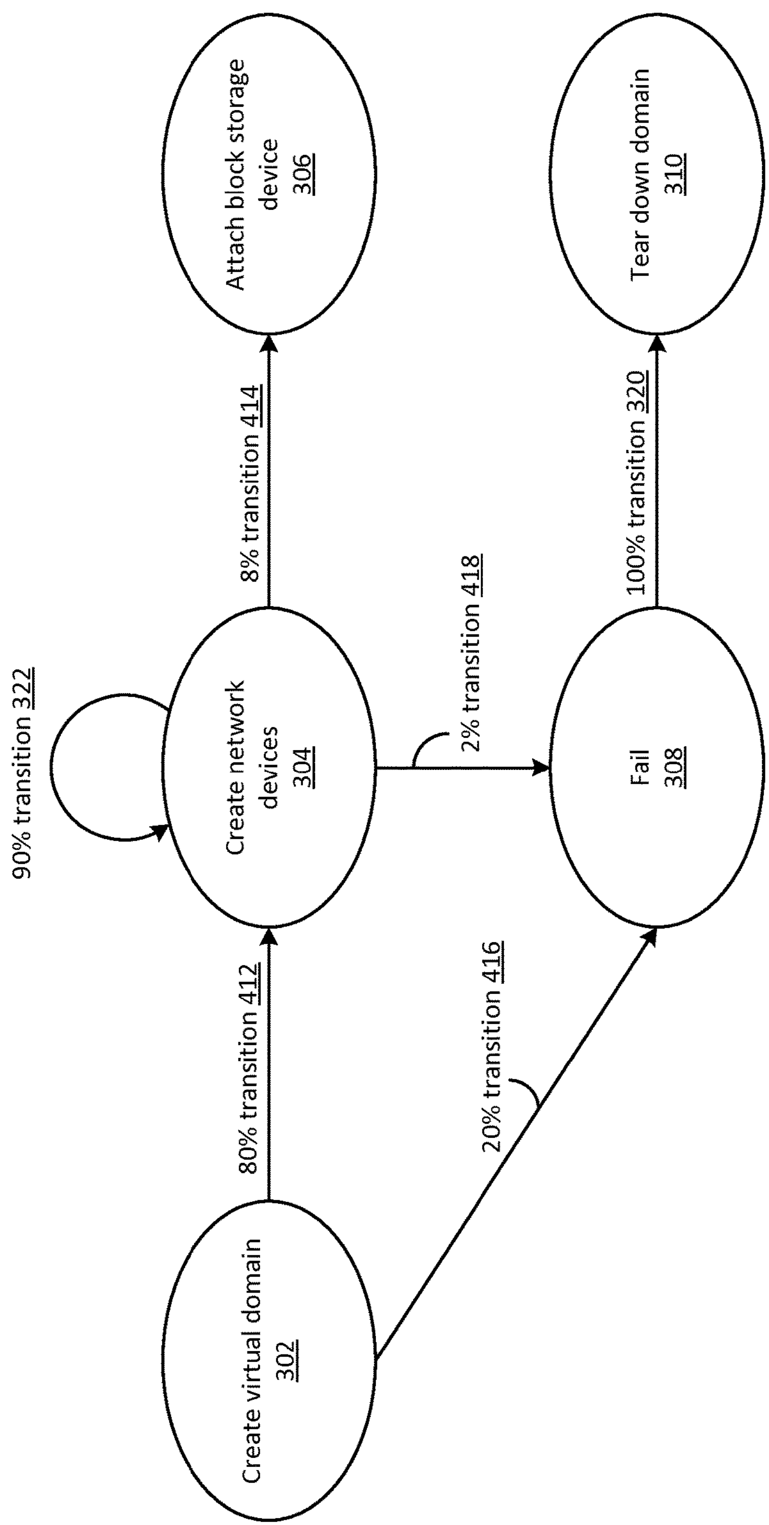
FIG. 4 depicts another example state model that concerns a computing node in an abnormal condition.

FIG. 3 depicts an example Markov model, or state model, that concerns a computing node in a normal condition. This state model may be contrasted to the state model depicted in FIG. 4, which depicts an example state model that concerns a similar computing node in an abnormal condition. That the computing node corresponding to the state model in FIG. 4 is in an abnormal condition may not be determinable in isolation, but may be determinable with reference to the state model of FIG. 3, because the two state models differ. In embodiments, the state model of FIG. 3 may be generated to represent the states and transitions of servers 116*a* and 116*b* of FIG. 1.

FIG. 3 is described as having a state model that is determined based on one computing node. This is for ease of illustration. In embodiments, the state model depicted in FIG. 3 (as well as other embodiments described herein) may be based on characteristics of multiple computing nodes, where those characteristics are aggregated into one state model. For example, it may be that log files are analyzed for a plurality of computing nodes and those nodes are all determined to have the same, or similar states. Those states may be used for one state diagram that represents normal condition of these computing nodes collectively. Then, where the probability of a given transition between states, or the typical time spent in a particular state, differs between two computing nodes, these values may be aggregated, such as by producing an average of these values, or a range that these values may span.

As depicted, the state model in FIG. 3 covers the procedures of creating a virtual domain, creating network devices, and attaching block storage devices. These may be considered to the normal conditions during normal operation of the computing node—create virtual domain 302, which has a 99% probability of transition 312 to create network devices 304, which in turn has a 9% probability of transition 314 to attach block storage device 306. Likewise, there is a 1% probability of transition 316 from create virtual domain 302 to fail 308, representing a probability of an error occurring in creating network devices. Additionally, there is a 1% probability of transition 320 from create network devices 304 to fail 308, representing a probability of an error occurring in attaching a block storage device. Where the fail 308 state is reached, there is a 100% probability of transition 320 to tear down domain 310, where the virtual domain created in create virtual domain 302 is torn down because the full process from create virtual domain 302 through attach block storage device 306 was unsuccessful.

The create network devices 304 state also has a loopback—transition 322—that has a 90% probability of transition out of create network devices 304. This loopback may occur while a network device is attached, and then if some amount of time passes without that successfully occurring—e.g., one minute—it may be determined to be an error, at which point transition 318 is followed. Likewise, it may be that if the network device is attached successfully anytime within that time period, then transition 314 is followed.

In embodiments, the state model depicted in FIG. 3 may also include information about the time that a computing node is expected to spend in each state. This information may be used along with information about the states and transitions to determine whether a particular computing node is in a normal or an abnormal condition.

FIG. 4 depicts another example state model that concerns a computing node in an abnormal condition. This state model may be contrasted to the state model depicted in FIG. 3, which depicts an example state model that concerns a similar computing node in a normal condition. That the computing node corresponding to the state model in FIG. 4 is in an abnormal condition may not be determinable in isolation, but may be determinable with reference to the state model of FIG. 3, because the two state models differ. In embodiments, the state model of FIG. 3 may be generated to represent the states and transitions of servers 116*a* and 116*b* of FIG. 1.

The state model of FIG. 4 has the same states as the state model of FIG. 3—create virtual domain 302, create network devices 304, attach block storage device 306, fail 308, and tear down domain 310. Additionally, there are the same transitions between states as there are in the state model of FIG. 3: a transition between create virtual domain 302 and create network devices 304; a transition between create network devices 304 and attach block storage device 306; a transition between create virtual domain 302 and fail 308; a transition between create network devices 304 and fail 308; and a transition between fail 308 and tear down domain 310.

How the state model of FIG. 4 differs from the state model of FIG. 3 is in the probabilities that various of the transitions will be made. Whereas, in FIG. 3, transition 312 represents a 99% probability of transitioning from create virtual domain 302 to create network devices 304, in FIG. 4 transition 412 represents only an 80% probability of transitioning from create virtual domain 302 to create network devices 304. Likewise, whereas, in FIG. 3, transition 314 represents a 9% probability of transitioning from create network devices 304 to attach block storage device 306, in FIG. 4 transition 412 represents only an 8% probability of transitioning from create network devices 304 to attach block storage device 306.

These lower probabilities of transition may be indicative of an abnormal condition of the corresponding computing node and, as described in more detail in both previous and subsequent paragraphs, an abnormality detection engine, such as abnormality detection engine 124 of FIG. 1, which, in embodiments, may be implemented as a service and/or on each computing node may detect the differences in the models and initiate a remediation action. When the two probabilities of transition are each 99%, then the probability of successfully transitioning from create virtual domain 302 to attach block storage device 306 is 89% (99%*90%—where, ignoring the loopback transition 322, create network devices 304 has an associated 90% probability of successfully transitioning to another state without an associated error). However, when the two probabilities of transition are each 80% (again, ignoring the probability associated with the loopback transition 322 and considering only the respective probabilities associated with transitioning out of create network devices 304), then the probability of successfully transitioning from create virtual domain 302 to attach block storage device 306 is reduced to 64% (80%*80%).

Similarly, as depicted in FIG. 4, while the probabilities associated with transition 412 and transition 414 have gone down relative to the probabilities associated with transition 312 and transition 314, respectively, the probabilities associated with transition 416 (20%) and transition 418 (2%) have increased relative to the probabilities associated with transition 316 (1%) and transition 318 (1%). In the embodiments depicted in FIGS. 3-4, upon reaching fail 308, the state model moves to tear down domain 310, so the probability associated with transition 320 is the same as the probability associated with transition 420—100%.

Figure 5:
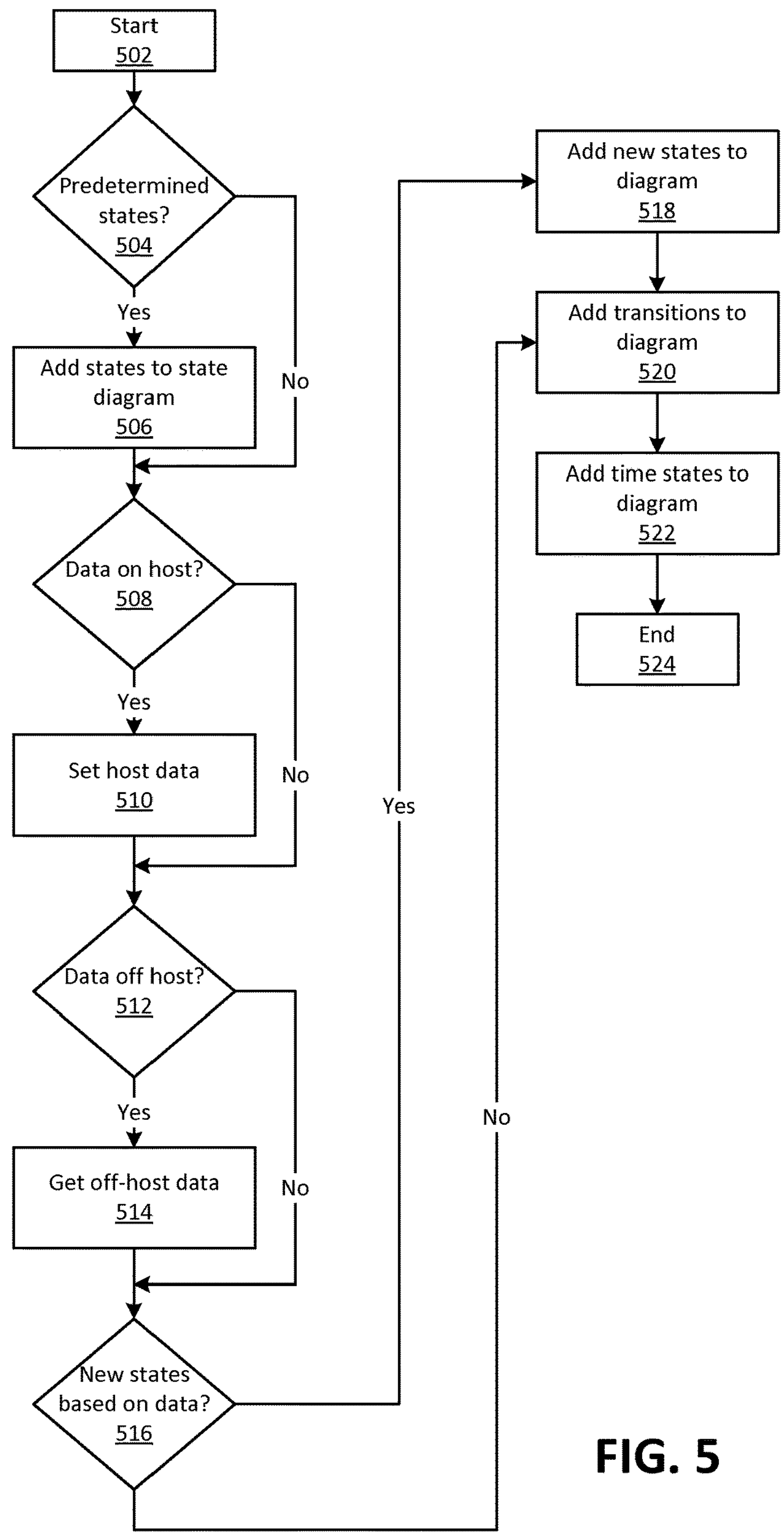
FIG. 5 depicts example operating procedures for creating a state model, such as depicted in FIGS. 3-4.

FIG. 5 depicts example operating procedures for creating a state model, such as depicted in FIGS. 3-4. It may be appreciated that there are embodiments that implement the operating procedures of FIG. 5 (and FIGS. 6-7 and 9) in a different order than is depicted. For example, in embodiments, operations 504-506 may be implemented after operation 514. Additionally, it may be appreciated that there are embodiments that implement fewer, or more, operating procedures than are depicted in FIG. 5 (and FIGS. 6-7 and 9). For example, where it is known in advance that there are no predetermined states for the state model, embodiments may omit operations 504 and 506. The state model created using these operating procedures may be part of a nested state model. For example, one state model may be created for a computing node, and another state model may be created for a larger system, of which that computing node is one part. This nested state model may be then analyzed for adaptive changes or abnormal condition as described for a state model in FIGS. 6-7. The operating procedures of FIG. 5 begin with operation 502, and move to operation 504.

Operation 504 depicts determining whether there are any predetermined states for a state model. These states may represent states that a computing node may be in, such as create virtual domain 302 or create network devices 304 as depicted in FIGS. 3-4. These states may be supplied via user input that indicates the states. In embodiments, some or all states for a state model are supplied as predetermined states. In embodiments, some or all states may be determined based on data from log files, as is described in more detail below. If there are predetermined states for the state model, the operating procedures of FIG. 5 move to operation 506. If there are not predetermined states for the state model, the operating procedures of FIG. 5 move to operation 508. If there are predetermined states for the state model, the operating procedures of FIG. 5 move to operation 506.

Operation 506 depicts adding the predetermined states to the state model. This operation may occur where in operation 504 it is determined that there are such predetermined states. Where the state model is implemented on a computer using data structures that represent states and transitions, adding the predetermined states to the state model may comprise creating new instances of data structures that represent these predetermined states. After operation 506 (or if it was determined in operation 504 that there are no predetermined states), the operating procedures of FIG. 5 move to operation 508.

Operation 508 depicts determining if there is data on the host. The host may be the computing node for which a state model is being created. The data on the host may be data contained in one or more log files that is both created by the host and stored on the host. The data in the log files may indicate an action that the host performed, how long it spent performing that action, and what action it performed after performing that action. For example, using the state models of FIGS. 3-4, the data in log files on the host may indicate when, and for how long, the host spent creating a virtual domain, and what action the host performed after creating the virtual domain. Determining if there is data on the host may then comprise determining whether there is data stored in one or more of these log files in a known location on the host. In terms of the state model being a hidden Markov model, the data in the log files may be observations about the state of the state model, from which the states may be inferred. If there is data on the host, the operating procedures of FIG. 5 move to operation 510. If there is not data on the host, the operating procedures of FIG. 5 move to operation 512.

Operation 510 depicts retrieving the data from the host. In embodiments where the operating procedures of FIG. 5 are implemented on a computing node that is different from the host, operation 510 may comprise retrieving the data from the host. In embodiments where the operating procedures of FIG. 5 are implemented on the host, operation 510 may comprise reading the data into a memory or copying the data to another location, from where it may be analyzed to determine a state model. After operation 510 (or if it was determined in operation 508 that there is no data on the host to retrieve), the operating procedures of FIG. 5 move to operation 512.

Operation 512 depicts determining if there is data off-host. Data off-host may be data created and stored by a computing node other than the host. For example, where there is a computing node of data center 110 that receives API calls directed to the host and issued by computer **102*a* or 102*b* as part of a web service platform, and processes these API calls before issuing corresponding commands to the host, this computing node may store data relating to these API calls. An example of such an API call may be to create an instance on the host. Another example of off-host data may be found in a block storage device manager that attaches a network-accessible block storage device to the host, and may create data in log files in the process of attaching the network-accessible block storage device to the host. Where there are multiple log files, such as with data on host and off host, the log files may be joined together and treated as if they were database tables. Then, they may be analyzed for state model information. If there is data off-host, the operating procedures of FIG. 5 move to operation 514. If there is not data on the host, the operating procedures of FIG. 5 move to operation 516**.

Operation 514 depicts retrieving the data from off the host. Operation 514 may be implemented in a similar manner as operation 510. After operation 514 (or if it was determined in operation 512 that there is no data off the host to retrieve), the operating procedures of FIG. 5 move to operation 516.

Operation 516 depicts determining whether there are new states for the state model based on the retrieved data. This may involve determining if there are any actions for the host in the host data or the off-host data that are not identified in any predetermined states. For example, operation 516 may include determining that the host performs an action of creating a virtual domain, and that this action is not accounted for in a state among any predetermined states. In such an instance, it may be determined that there is a new state for the state model based on the retrieved data, and that this new state corresponds to creating a virtual domain. Determining if there are new states may comprise determining states from the data in log files, which includes some of the predetermined states. Of this larger group of states, the states that correspond to predetermined states that have already been added to the state model may be determined. If there are new states for the state model based on the retrieved data, the operating procedures of FIG. 5 move to operation 518. If there are not new states for the state model, then the operating procedures of FIG. 5 move to operation 520.

Operation 518 depicts adding new states to the state model. In embodiments, operation 518 may be implemented in a similar manner as operation 506. After operation 518 (or if it was determined in operation 516 that there are not new states for the state model), the operating procedures of FIG. 5 move to operation 520.

Operation 520 depicts adding transitions to the state model. In embodiments, there may be predetermined transitions that are already part of the state model, similar to the predetermined states of operation 504. In embodiments, the transitions may be determined by analyzing the data in the log files to determine which actions follow other actions. For example, where an action is to launch an instance, the next action may be to send an acknowledgement to some entity that the instance was successfully launched, or to send an error that the instance was not successfully launched. In this scenario, there may be two transitions to be added to the state model: (1) a transition from launching the instance to sending acknowledgment that the instance was successfully launched; and (2) a transition from launching the instance to failure and returning an error that the instance was not successfully launched. After operation 520, the operating procedures of FIG. 5 move to operation 522.

Operation 522 depicts adding a time spent in the states to the state model. Where the data in the log files contains a time at which the actions were begun, operation 522 may comprise of determining the time spent in a state to be the time between when an action corresponding to that state began and a time when an action corresponding to another state began. In embodiments, the time spent in a state may be an average time, a median time, or some other measurement, such as a range over which the standard deviation of the times spent in that state vary. After operation 522, the operating procedures of FIG. 5 move to operation 524, where the operating procedures of FIG. 5 end.

Figure 6:
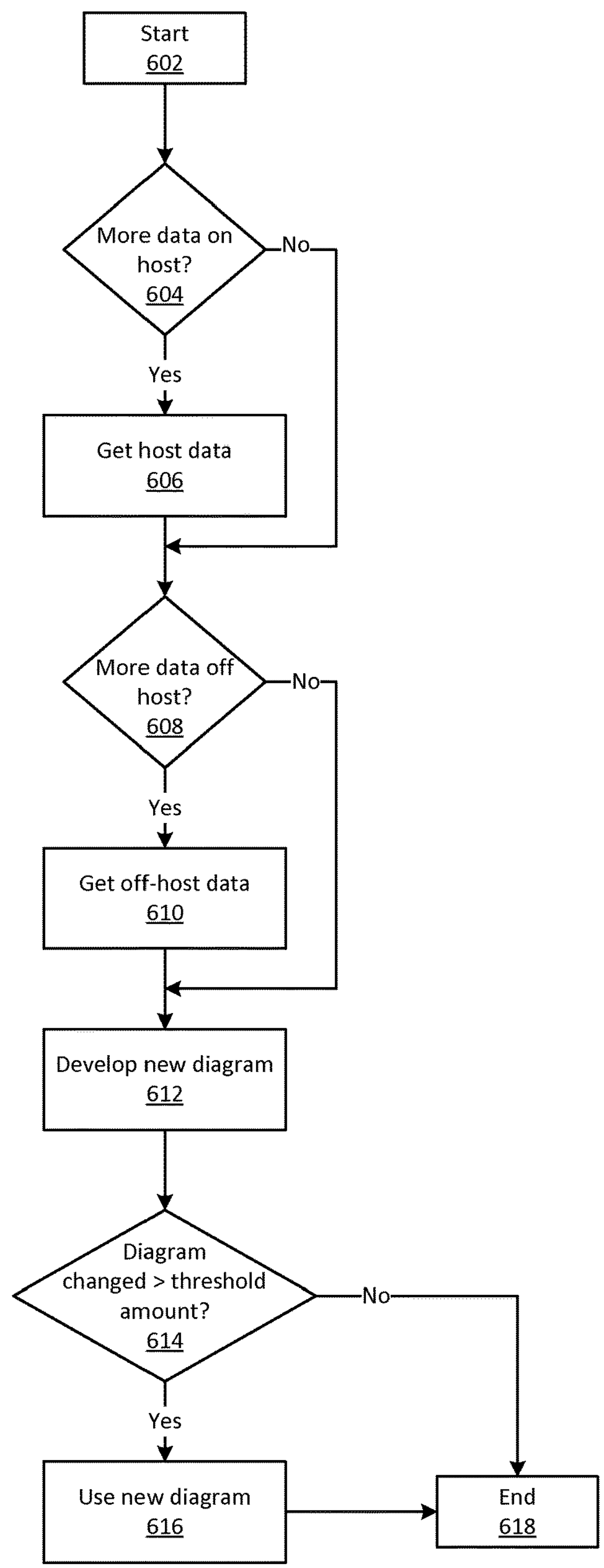
FIG. 6 depicts example operating procedures for updating a state model, such as the state model depicted in FIG. 3.
Figure 7:
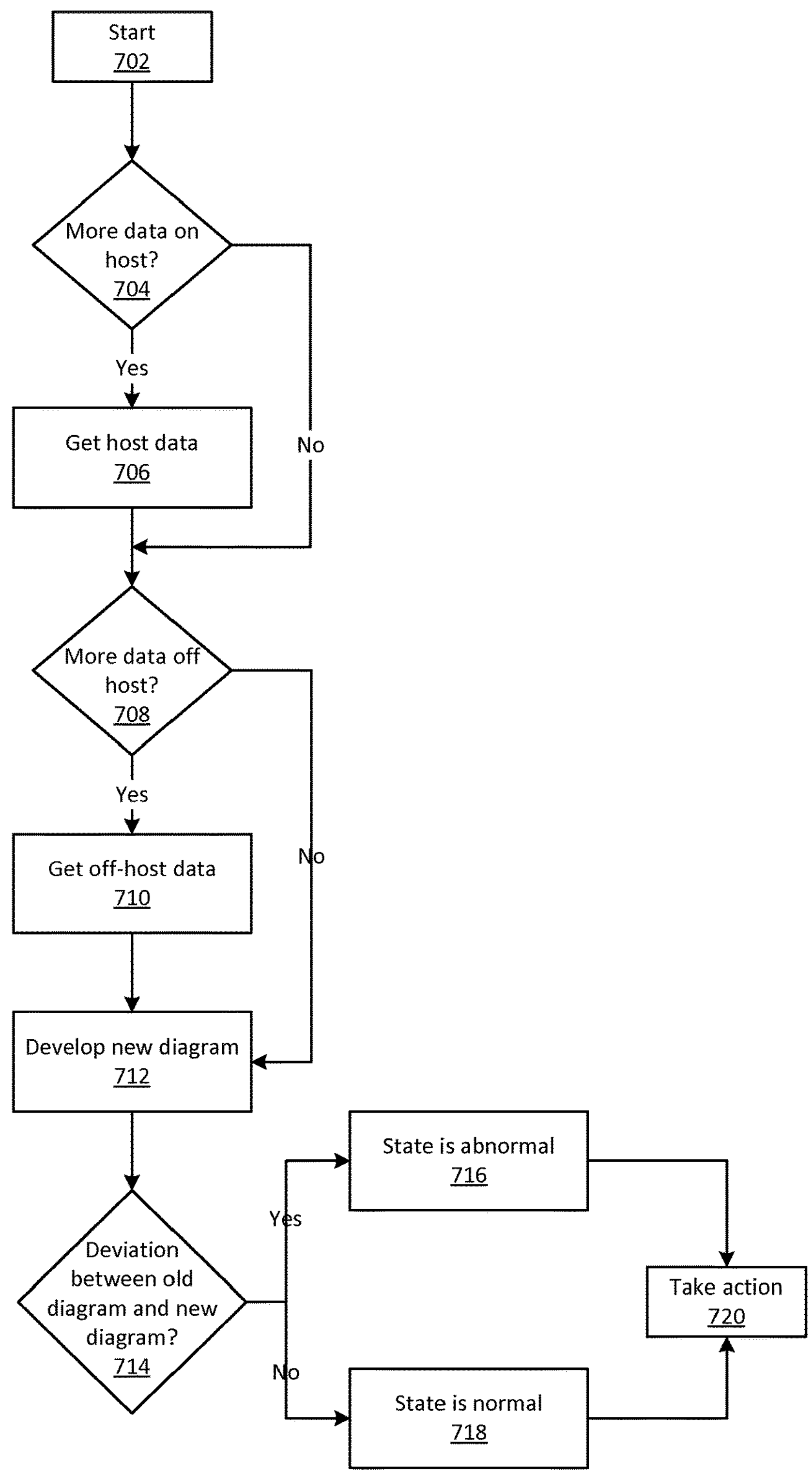
FIG. 7 depicts example operating procedures for determining that a computing node is in an abnormal condition through the use of state models, such as the state models depicted in FIGS. 3-4.

FIG. 6 depicts example operating procedures for updating a state model, such as the state model depicted in FIG. 3. The operating procedures of FIG. 6 may be implemented after the operating procedures of FIG. 5 have been implemented, to determine whether the state model has changed and should be updated. The underlying data that is the basis for the state model may vary over time. For example, a host may have typically spent 30 seconds to launch an instance when the state model was created using the operating procedures of FIG. 5. That amount of time may change over time, and may later be 40 seconds to launch an instance. This change in the time to launch an instance may not be indicative of an abnormal condition of the host, but may be indicative that what is normal has changed over time. The operating procedures of FIG. 7 depict using additional data to determine that the host is now in an abnormal condition.

The operating procedures of FIG. 6 begin with operation 602 and move to operation 604. Operation 604 depicts determining if there is additional data on the host. Operation 604 may be implemented in a similar manner as operation 508 of FIG. 5. Since time may have passed between when the state model was created in the operating procedures of FIG. 5 and when the operating procedures of FIG. 6 have run, the host may have accumulated more data in log files. If there is additional data on the host, the operating procedures of FIG. 6 move to operation 606. If there is not additional data on the host, the operating procedures of FIG. 6 move to operation 608.

Operation 606 depicts retrieving data from the host. Operation 606 may be implemented in a similar manner as operation 510 of FIG. 5. In embodiments, this additional data is appended to the log files that still contain the data obtained in operation 510 of FIG. 5. In such embodiments, an entity implementing these operating procedures may track when data on the host was last used to create a state model, update a state model and/or determine whether the new data is indicative of the host being in an abnormal condition. In such embodiments, this additional data generated after this time may be retrieved and used in the operating procedures of FIG. 6. After operation 606 (or if it was determined in operation 604 that there is no additional data on the host), the operating procedures of FIG. 6 move to operation 608.

Operation 608 depicts determining if there is additional data off the host. Operation 608 may be implemented in a similar manner as operation 512 of FIG. 5. Since time may have passed between when the state model was created in the operating procedures of FIG. 5 and when the operating procedures of FIG. 6 have run, there may be more data generated and stored in off-host log files. If there is additional data off the host, the operating procedures of FIG. 6 move to operation 610. If there is not additional data off the host, the operating procedures of FIG. 6 move to operation 612.

Operation 610 depicts retrieving data from off the host. In embodiments, operation 610 may be implemented in a similar manner as operation 606 as applied to off-host data. After operation 610 (or if it was determined in operation 608 that there is no additional data on the host), the operating procedures of FIG. 6 move to operation 612.

Operation 612 depicts developing a new state model. In embodiments where the former state model was developed using predetermined states, such as in FIG. 5, these predetermined states may also be used to develop the new state model. In embodiments, operation 612 may be implemented in a manner similar to operations 516-522 of FIG. 5. After operation 612, the operating procedures of FIG. 6 move to operation 614.

Operation 614 depicts determining whether the state model has changed more than a threshold amount. This may involve determining, for example, if there are different, more or fewer states and/or transitions in the new state model relative to the old state model; if a probability associated with a transition is different in the new state model relative to the old state model; and/or if an amount of time spent in a state is different in the new state model relative to the old state model. In embodiments, it may be determined that the state model has changed only where the new state model differs from the old state model by a threshold amount. For example, it may be determined that the state model has changed where a probability associated with a transition has changed by at least 10%, or a time spent in a state has changed by at least 10%. If the state model has changed, the operating procedures of FIG. 6 move to operation 616. If the state model has not changed, the operating procedures of FIG. 6 move to operation 618, where the operating procedures of FIG. 6 end.

Operation 616 depicts using the new state model. Where it is determined that the state model has changed sufficiently, the new state model may be used in place of the old state model, as a way of updating the state model. In embodiments where the state model is represented in a computer via data structures, this may comprise updating the data structures for the old state model to reflect the changes in the new state model, or replacing the data structures of the old state model with the data structures of the new state model. After operation 616, the operating procedures of FIG. 6 move to operation 618, where the operating procedures of FIG. 6 end.

FIG. 7 depicts example operating procedures for determining that a computing node is in an abnormal condition through the use of state models, such as the state models depicted in FIGS. 3-4. A computing node analyzed using the operating procedures of FIG. 7 may be different from a computing node for which a state model was created using the operating procedures of FIG. 5. Whereas the operating procedures of FIG. 6 are used to analyze additional data to create a new state model as a way to update a state model over time, the operating procedures of FIG. 7 are used to analyze additional data to create a new state model to determine whether a computing node for which this state model is made is in a normal or an abnormal condition. It may be that one computing node is not in an abnormal condition, but that it performs the same function as another computing node, but in a different manner. That the two computing nodes perform a function in different manners may be identified using the operating procedures of FIG. 7, and be used to investigate the source of this difference.

In embodiments, operating procedures 702, 704, 706, 708, 710, and 712 may be implemented in a manner similar to operations 602-612, respectively, of FIG. 6. After operation 712, the operating procedures of FIG. 7 move to operation 714.

Operation 714 depicts determining whether there is a deviation between the old state model and the new state model. In embodiments, operation 714 may be implemented in a similar manner as operation 614 of FIG. 6. For example, where the state model of FIG. 4 is the new state model, and the state model of FIG. 3 is the old state model, it may be determined that there is a deviation, because some probabilities of transitions are different. Whereas, in FIG. 3, transition 312 represents a 99% probability of transitioning from create virtual domain 302 to create network devices 304, in FIG. 4 transition 412 represents only an 80% probability of transitioning from create virtual domain 302 to create network devices 304. Likewise, whereas, in FIG. 3, transition 314 represents a 99% probability of transitioning from create network devices 304 to attach block storage device 306, in FIG. 4 transition 412 represents only an 80% probability of transitioning from create network devices 304 to attach block storage device 306. In other embodiments, the time that is spent in a particular state in a state model may vary between the old state model and the new state model, and this difference in time may be indicative of deviation between the two models. For example, the time spent in the state for creating a virtual domain 302 may vary between FIGS. 3 and 4. Where this time increases, it may be indicative of the computer node for which the state model is being created becoming overloaded, so it has fewer processing resources to spend on creating the virtual domain, so creating the virtual domain takes longer.

In embodiments, there may be a deviation between the two state models of in operation 714 where there is a difference in the number and types of states or transitions in the respective state models. In other embodiments, this deviation may comprise a difference in the probability of a particular transition occurring in the respective state models. It may be that there is a minimum predetermined amount of deviation for deviation to be recognized between the two state models. For example, the predetermined amount of difference to determine that deviation exists between the old and new state models may be 10% for a probability of a transition occurring (or, a different percentage in other embodiments, such as 5% or 20%). Thus, where the probability of a particular transition occurring in the old state model is 80% and the probability of a corresponding transition occurring in the new state model is 85%, it may be determined that there is no deviation for the purposes of operation 714, because the two probabilities deviate by 5%, which is less than the 10% threshold. In contrast, where the probability of a particular transition occurring in the old state model is 80% and the probability of a corresponding transition occurring in the new state model is 65%, it may be determined that there is deviation for the purposes of operation 714, because the two probabilities deviate by 15%, which is greater than the 10% threshold. A similar predetermined amount of difference may exist for time—e.g., if the average time spent in a particular state differs by more than 10% between the old and new state models, then it is determined that deviation exists.

As used herein, the predetermined amount of difference (or predetermined amount of similarity) may be statistically determined based on multiple state diagrams. For example, the predetermined amount of distance may be one standard deviation from the average amount of a given metric (e.g., the given metric may be how long a state model typically stays in a particular state), or two standard deviations from that metric. The predetermined amount of difference may be a percentage difference from the median or mean value of a particular metric as measured among a plurality of state models. In embodiments, the predetermined amount of difference may be a standard deviation or percentage difference from a mode value of a particular metric. Similar statistical determination may be applied to determining a predetermined distance and a predetermined number of vectors as described below with respect to clustering embodiments.

Where there is a deviation between the old state model and the new state model, the operating procedures of FIG. 7 move to operation 716. Where there is not a deviation between the old state model and the new state model. The operating procedures of FIG. 7 move to operation 718.

Operation 716 depicts determining that the state of the computing node in question is normal. After operation 716, the operating procedures of FIG. 7 move to operation 720, where an action is taken. In embodiments where the condition of the computing node is normal, this action taken may comprise storing an indication of this in a computing node that is accessible by an administrator. The administrator may then check the indication of condition for multiple computing nodes for multiple computing nodes in a datacenter from one location, and have a central location to determine which parts of the datacenter are in an abnormal condition and may need attention. After operation 720, the operating procedures of FIG. 7 end.

Operation 718 depicts determining that the condition of the computing node in question is abnormal. After operation 718, the operating procedures of FIG. 7 move to operation 720, where an action is taken. In embodiments where the condition of the computing node is abnormal, this action taken may be to store an indication of this in a computing node that is accessible by an administrator, to generate an alarm or a ticket that signals to an administrator that the computing node is in abnormal condition along with a possible cause of the abnormal condition. In other embodiments, this action taken may be to send an indication to a load balancer that places customer processes (like VM instances) on computing nodes to not assign any additional customer processes to this computing node until the computing node returns to a normal condition, and to shift processes currently on the computing node away from the computing node. After operation 720, the operating procedures of FIG. 7 end.

Figure 8:
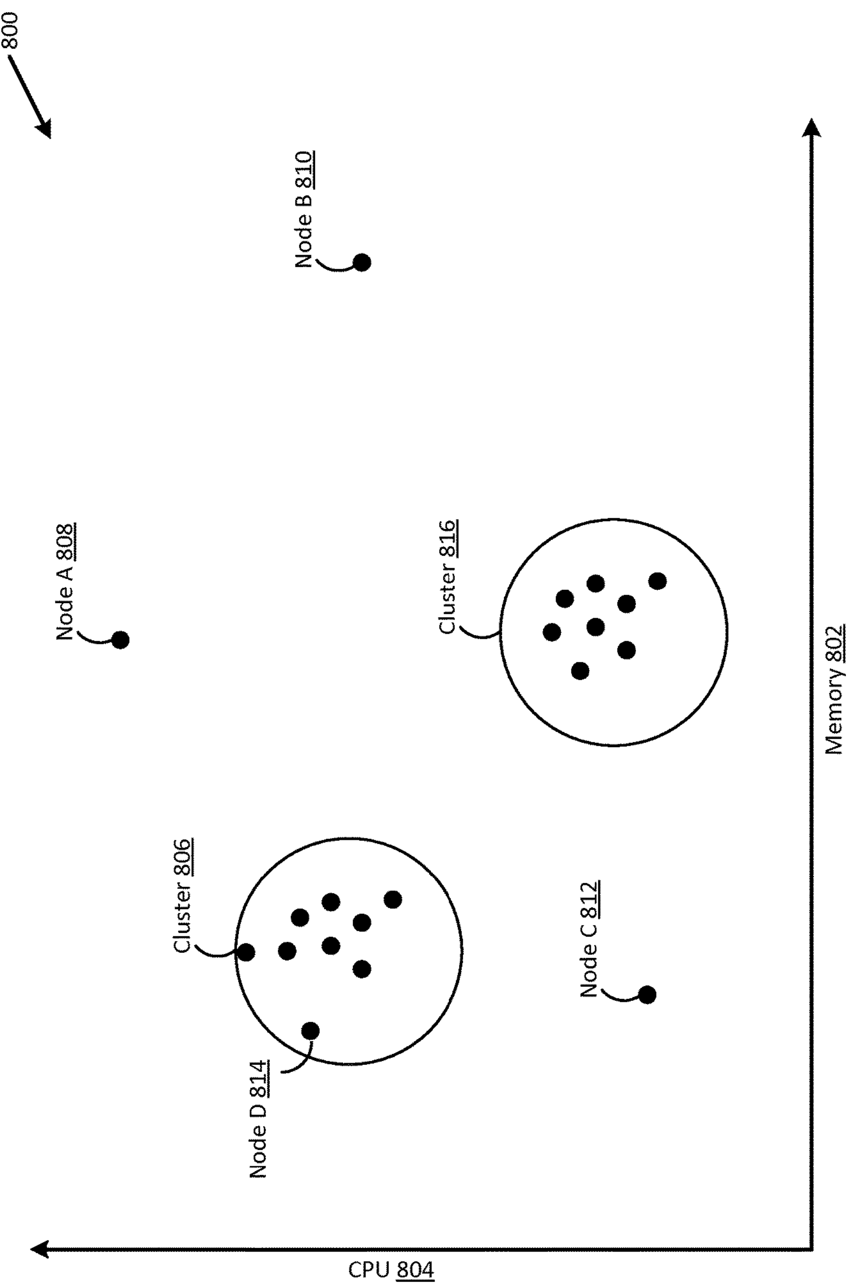
FIG. 8 depicts an example clustering of computing node states, which can be used to determine that a computing node is in an abnormal condition.

FIG. 8 depicts an example clustering of computing node states, which can be used to determine that a computing node is in an abnormal condition. The clustering may be done to create a notion of what a normal condition is for a computing node. A clustering may be done among computing nodes of specific types—e.g., computing nodes that have a specific instance type, hardware type or that were run at a similar time. Graph 800 plots vectors for computing nodes based on their characteristics. As depicted, there are two characteristics of each computing node used in a vector—CPU and memory. There may be other characteristics, as described below. The depicted characteristics, or resources, are represented in graph 800 as CPU 804 on the Y-axis of graph 800 and memory 802 on the X-axis of graph 800. It may be appreciated that N-dimensional vectors may be used in clustering computing node states, where N is greater than two. For ease of illustration, N=2 here, with the two being CPU and memory. Other characteristics may include network traffic, latency to disks, load, I/O to storage devices, the rate of growth of log files and the number of errors for a particular application within a particular time frame.

Figure 9:
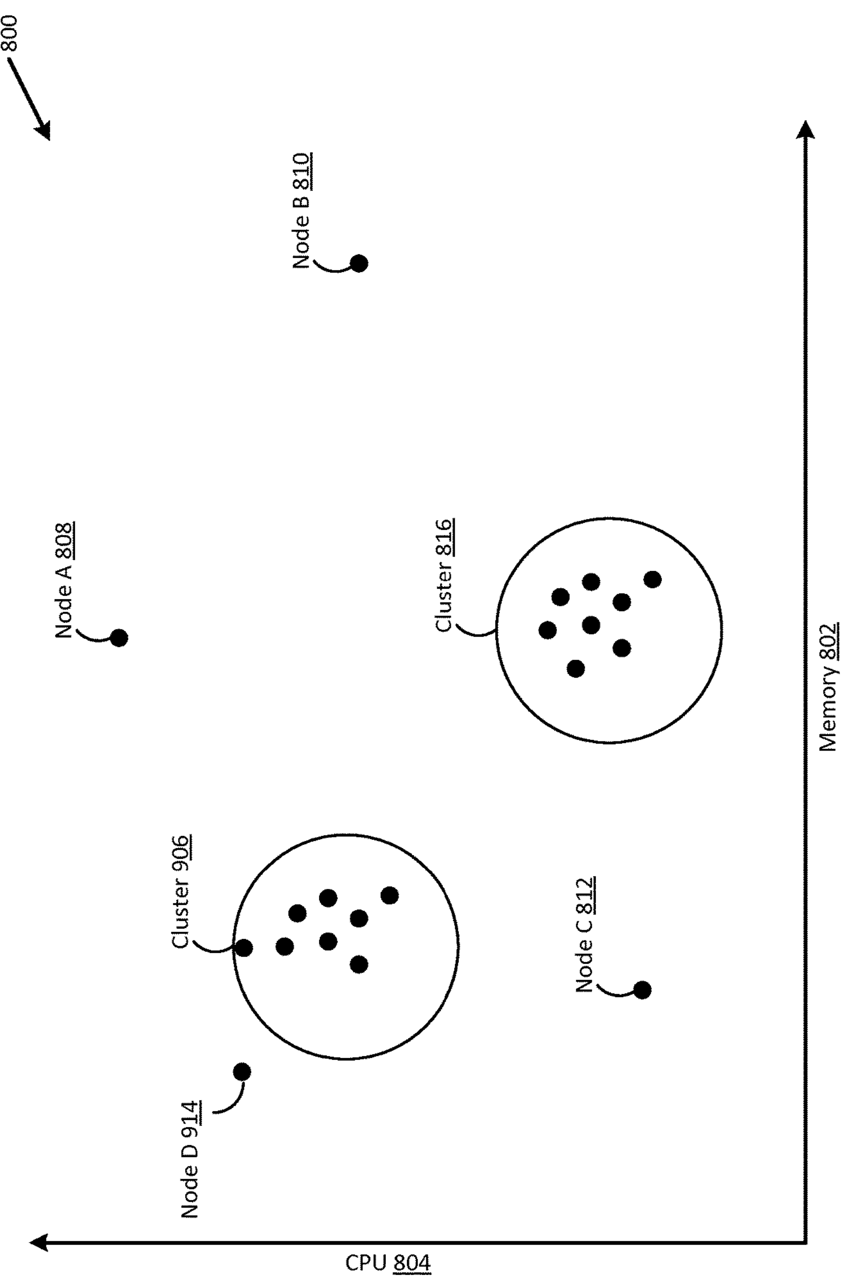
FIG. 9 depicts another example clustering of computing node states, where a computing node that had a normal condition in FIG. 8 now has an abnormal condition.

There are two clusters depicted—cluster 806 and cluster 816. Both clusters 806 and 816 contains several vectors for computing nodes that have similar CPU and memory values. Within cluster 806, node D 814 is specifically depicted, because FIG. 9 illustrates how this node (depicted there as node D 914 to reflect a change) may have its characteristics change, which cause it to move out of cluster 806 (depicted there as cluster 906 to reflect a change). There are also several computing nodes depicted in graph 800 that are outside of cluster 806—node A 808, node B 810, and node C 812. As depicted, these four nodes are outside of both clusters 806 and 816 for different reasons. Node A 808 has both a memory value and a CPU value that are greater than those of nodes found within cluster 806. While node A 808 has a memory value that would place it in cluster 816 based on memory alone, node A 808 has a CPU value that is too high for cluster 816. Node B 810 does have a CPU value that is within a range of values among nodes found within cluster 806, but has a memory value that is greater than those of nodes found within cluster 806. Similarly, node B 810 is outside of cluster 816 because both its memory and CPU values are too high for cluster 816. Node C 812 does have a memory value that is within a range of values among nodes found within cluster 806, but has a CPU value that is greater than those of nodes found within cluster 806. While node C 812 has a CPU value that would place it in cluster 816 based on CPU alone, node C 812 has a memory value that is too low for cluster 816.

As depicted, the boundary of clusters 806 and 816 may be determined in a variety of ways. In embodiments, the vectors for nodes may be graphed and displayed in a user interface, and user input may be received at the user interface that indicates these boundaries. While depicted as being circular, these boundaries may take on any shape as specified through user input. In other embodiments, the boundaries may be determined without user input. For example, a cluster may be determined as being those nodes that are within a predetermined distance from each other when graphed, such as in graph 800.

Where there are multiple clusters in a graph, these multiple clusters may be indicative of different conditions. For example, cluster 806 contains nodes with larger CPU values and lower memory values than the nodes contained within cluster 816. It may be that, while both of these clusters are considered to have nodes in a normal condition, new virtual machine instances that are expected to be taxing on a CPU will generally be favored for placement on nodes of cluster 816 over nodes of cluster 806. Likewise, it may be that new virtual machine instances that are expected to be taxing on memory will generally be favored for placement on nodes of cluster 806 over nodes of cluster 816.

While CPU and memory are depicted as characteristics, or resources, used to cluster nodes here, there may be other characteristics of nodes that are used in other embodiments. These characteristics may include a type of virtual machine instance (e.g., the amount of virtual memory or disk that the virtual machine presents to the instance), where the node is an instance or hosts an instance, or a type of hardware, where the node is a physical host or an instance hosted on a physical host. These characteristics may also include a measurement of errors in a given amount of time (possibly a measurement of a particular type of errors, like network-traffic-based errors).

These characteristics may relate to I/O and transfer rate statistics. For instance, these characteristics may include a rate of I/O requests issued to physical devices, a rate of read requests issued to physical devices, a rate of write requests issued to physical devices, a rate of blocks of data (a block may be 512 bytes) read, and a rate of blocks of data written.

These characteristics may relate to virtual memory paging statistics. For instance, these characteristics may include a rate of data the system has paged in to memory from disk. These characteristics may include a rate of data the system has paged out from memory to disk. These characteristics may include a rate of page faults. These characteristics may include a rate of major page faults (where a minor page fault is one where the page is in memory but not marked by the memory management unit as such, and a major page fault is one where the page is not in memory).

These characteristics may rate to activity for a block storage device. These characteristics may include a rate of transfers issued to that device. These characteristics may include a rate of sectors read from the device (a sector may be 512 bytes). These characteristics may include a rate of sectors written to the device. These characteristics may include an average size of requests issued to the device. These characteristics may include an average queue length of the requests that were issued to the device. These characteristics may include an average time for I/O requests issued to the device to be served (including the time spent by the requests in queue and the time spent servicing them). These characteristics may include an average service time for I/O requests issued to the device. These characteristics may include an amount of CPU time during which I/O requests were issued to the device.

These characteristics may rate to activity for threads that execute on one or more processors. These characteristics may include a number of processors waiting to run on a processor. These characteristics may include a number of threads and processes in a list of processes. These characteristics may include a system load average for a period of time (e.g., the last one, five, or 15 minutes).

These characteristics may rate to network activity. These characteristics may include a rate of packets received. These characteristics may include a rate of packets transmitted. These characteristics may include a rate of bytes received. These characteristics may include a rate of bytes transmitted. These characteristics may include a rate of compressed packets received. These characteristics may include a rate of compressed packets transmitted. These characteristics may include a rate of multicast packets received.

FIG. 9 depicts another example clustering of computing node states, where a computing node that had a normal condition in FIG. 8 now has an abnormal condition. The characteristics or processing resources used by a computing node may change over time, and that may cause a computing node that was within a cluster to move out of a cluster, or vice versa. As depicted here, node D 814 was within cluster 806 in FIG. 8. However, in FIG. 9 node D 914 has increased its CPU value relative to node D 814, and decreased its memory value relative to node D 814. Either one of these changes would move node D 914 outside of a cluster, depicted here as cluster 906 to reflect a difference with cluster 806—that node D 914 is not within cluster 906 while node D 814 is within cluster 806.

In embodiments, the condition of a node may be considered to have changed when that node moves into our out of a cluster. For example, in the time between the time depicted in FIG. 8 and the time depicted in FIG. 9, node D may have passed out of the cluster. Upon determining that node D has passed out of the cluster, its condition may be changed from normal to abnormal, and an administrator of node D may be notified of this change in condition.

Clusters may also be considered to be good or bad, in that they may indicate that nodes within that cluster are in a normal, healthy, or good condition, or in an abnormal, ill, or bad condition. For example, cluster 906 may be considered to be a good cluster where nodes of cluster 906 are in a normal condition, and cluster 816 may be considered to be a bad cluster where nodes of cluster 816 are in an abnormal condition. Whether a cluster is good or bad may be determined, for example, based on receiving user input indicative of this, or by a number or rate of errors produced by nodes within a particular cluster. For example, clusters where the respective nodes have a relatively low rate of errors may be considered to be good clusters, and clusters where the respective nodes have a relatively high rate of errors may be considered to be bad clusters. A rate of errors (or other information about errors produced by nodes) may be used as a metric to measure the state of nodes, similar to how CPU 804 and memory 802 are used as metrics in FIG. 9.

As discussed, nodes may migrate into or out of clusters. Where a node migrates into a good/bad cluster, that node may be considered to be in good/bad condition; and where a node migrates out of a good/bad cluster, that node may be considered to no longer be in that good/bad condition.

The condition of a computing node may change as an instance is placed on that computing node. In such a case, this changed condition may be used in placement decisions. For example, one or more instances may be removed from the computing node until it returns to its previous state or close to its previous state. Similarly, the condition of another part of a datacenter or a datacenter as a whole may change, and this information may be used in placement decisions, such as which datacenter of a plurality of datacenters that an instance is to be placed in.

As depicted, clusters contain multiple nodes. There may be embodiments where a single node is considered to be its own cluster. It may be measured against by taking snapshots of the nodes condition at various points of time. Where those snapshots of the one node are clustered together, that one node may be considered to be clustered. A cluster of one node may become a cluster of multiple nodes where a second node moves into that cluster over time. There may also be clusters that overlap, or that make up subsets or supersets of other clusters.

To determine whether a computing node is a member of a cluster, or what condition it is in, that computing node's characteristics may be compared with the characteristics of one or more other computing nodes in some embodiments, and may be compared with the characteristics of the same computing node at a prior time in other embodiments, or a combination thereof. These two comparison benchmarks—the characteristics of one or more other computing nodes, and with the characteristics of the same computing node at a prior time—may be referred to as baseline information. It may be appreciated that, while the embodiments described herein primarily deal with comparing a computing node's characteristics with the characteristics of one or more other computing nodes, a computing node's characteristics may also be compared with baseline information, which may include the characteristics of that same computing node at a prior time. Where a computing node is a member of a plurality of computing nodes, it may be said that the computing node's characteristics are compared against the characteristic of at least a subset of the plurality of computing nodes. This subset may include the computing node itself at a prior time, and/or one or more other computing nodes at the current time or at a prior time.

Figure 10:
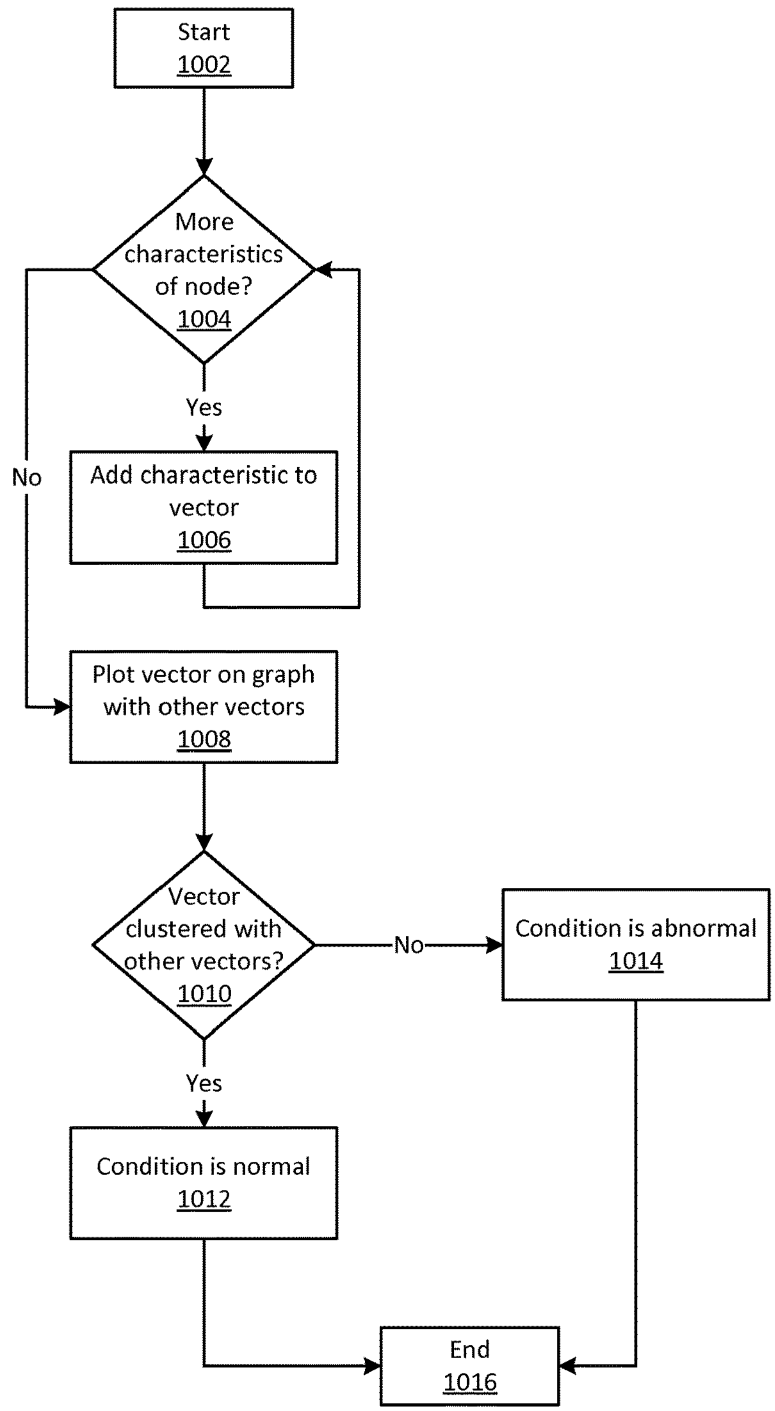
FIG. 10 depicts example operating procedures for determining that a computing node is in an abnormal condition through the use of clustering, such as the clustering depicted in FIG. 8.

FIG. 10 depicts example operating procedures for determining that a computing node is in an abnormal condition through the use of clustering, such as the clustering depicted in FIGS. 8-9. In embodiments, the operating procedures of FIG. 10 may be used to cluster servers 116*a* and 116*b* to determine whether they (along with other servers) are in a normal or an abnormal condition.

The operating procedures of FIG. 10 begin with operation 1002. After operation 1002, the operating procedures of FIG. 10 move to operation 1004. Operation 1004 depicts determining if there are additional characteristics of a computing node that are to be considered in evaluating the computing node with clustering techniques. There may be several characteristics of a computing node to evaluate. FIG. 8 depicts using CPU and memory. Other characteristics may include disk I/O, network bandwidth and system load. Where there are additional characteristics of the computing node that are to be considered in evaluating the computing node with clustering techniques, the operating procedures of FIG. 10 move to operation 1006. Where there are not additional characteristics of the computing node that are to be considered in evaluating the computing node with clustering techniques, the operating procedures of FIG. 10 move to operation 1008.

Operation 1006 depicts adding the next characteristic of the computing node to a vector for the computing node. A vector may be an N-dimensional point in a coordinate system. More generally, it may be a collection of characteristics of a computing node. This may comprise measuring that characteristic on the computing node, such as through a system monitoring process that monitors things like CPU and memory resources being used and responds with this information when queried to do so. After operation 1006, the operating procedures of FIG. 10 return to operation 1004.

Operation 1008 depicts plotting the vector on a graph with vectors representing characteristics of other computing nodes. It may be appreciated that there are embodiments that omit plotting vectors on a graph, and compare the vectors in a different manner, such as by directly comparing a difference in their values. A graph embodiment has been shown for purposes of illustration and the graph conveys concepts relating to other clustering embodiments. Operation 1008 may comprise plotting the vector in a coordinate system in a manner similar to how node A 808, node B 810, node C 812, and node D 814 are plotted in FIG. 8. After operation 1008, the operating procedures of FIG. 10 move to operation 1010.

Operation 1010 depicts determining whether the vector for the computing node is clustered with other vectors for other computing nodes on the graph. This may comprise, for example, determining that at least a predetermined number of vectors are plotted within a predetermined distance from each other, and determining that the vector plotted in operation 1008 is within this predetermined distance from a predetermined number of vectors. If the vector plotted in operation 1008 is within this predetermined distance from a predetermined number of vectors, this vector may be considered to be clustered. If the vector plotted in operation 1008 is not within this predetermined distance from a predetermined number of vectors, this vector may be considered not to be clustered. Where the vector for the computing node is clustered with other vectors for other computing nodes on the graph, the operating procedures of FIG. 10 move to operation 1012. Where the vector for the computing node is not clustered with other vectors for other computing nodes on the graph, the operating procedures of FIG. 10 move to operation 1014.

Operation 1012 depicts determining that the state of the computing node in question is normal. The state of the computing node is determined to be normal in response to the vector for the computing node being clustered with the vector of other computing nodes, as determined in operation 1010. After operation 1012, the operating procedures of FIG. 10 move to operation 1016, where the operating procedures of FIG. 10 end.

Operation 1014 depicts determining that the condition of the computing node in question is abnormal. The condition of the computing node is determined to be abnormal in response to the vector for the computing node not being clustered with the vector of other computing nodes, as determined in operation 1010. After operation 1014, the operating procedures of FIG. 10 move to operation 1016, where the operating procedures of FIG. 10 end.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. Such systems may comprise at least one memory that bears instructions that, upon execution by at least one processor, cause the system perform effectuate certain results as described herein.

Most embodiments utilize at least one network that would be familiar to those skilled in the art for supporting communications using any of a variety of commercially-available protocols, such as TCP/IP (transmission control protocol/internet protocol), OSI (open systems interconnection), FTP (file transfer protocol), UPnP (universal plug and play), NFS (network file system), CIFS (common internet file system) and AppleTalk. The network can be, for example, a local area network, a wide-area network, a virtual private network, the Internet, an intranet, an extranet, a public switched telephone network, an infrared network, a wireless network and any combination thereof.

In embodiments utilizing a web server, the web server can run any of a variety of server or mid-tier applications, including HTTP servers, FTP servers, CGI servers, data servers, Java® servers and business application servers. The server(s) also may be capable of executing programs or scripts in response requests from user devices, such as by executing one or more web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially-available from Oracle®, Microsoft®, Sybase® and IBM®.

The environment can include a variety of data stores and other memory and storage media as discussed above. These can reside in a variety of locations, such as on a non-transitory computer-readable medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as random access memory ("RAM") or read-only memory ("ROM"), as well as removable media devices, memory cards, flash cards etc.

Such devices also can include a computer-readable storage media reader, a communications device (e.g., a modem, a network card (wireless or wired), an infrared communication device etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It may be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to non-transitory, volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the embodiments as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It may be understood, however, that there is no intention to limit the embodiments to the specific form or forms disclosed, but on the contrary, the intention is to cover all modifications, alternative constructions and equivalents falling within the spirit and scope of the embodiments, as defined in the appended claims.

The use of the terms “a” and “an” and “the” and similar referents in the context of describing the disclosed embodiments (especially in the context of the following claims) are to be construed to cover both the singular and the plural, unless otherwise indicated herein or clearly contradicted by context. The terms “comprising,” “having,” “including,” and “containing” are to be construed as open-ended terms (i.e., meaning “including, but not limited to,”) unless otherwise noted. The term “connected” is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., “such as”) provided herein, is intended merely to better illuminate embodiments and does not pose a limitation on the scope of the embodiments unless otherwise claimed. No language in the specification should be construed as indicating any non-claimed element as essential to the practice of the embodiments.

Preferred embodiments of this disclosure are described herein, including the best mode known to the inventors for carrying out the embodiments. Variations of those preferred embodiments may become apparent to those of ordinary skill in the art upon reading the foregoing description. The inventors expect skilled artisans to employ such variations as appropriate, and the inventors intend for the embodiments to be practiced otherwise than as specifically described herein. Accordingly, this embodiment includes all modifications and equivalents of the subject matter recited in the claims appended hereto as permitted by applicable law. Moreover, any combination of the above-described elements in all possible variations thereof is encompassed by the embodiments unless otherwise indicated herein or otherwise clearly contradicted by context.

All references, including publications, patent applications and patents cited herein are hereby incorporated by reference to the same extent as if each reference were individually and specifically indicated to be incorporated by reference and were set forth in its entirety herein.

What is claimed is:

1. A system to determine a state of a first service of a plurality of services, comprising:

the plurality of services;

at least one memory bearing instructions that, upon execution, cause the system at least to:

determine information about resources used by the first service at a current time, wherein the information comprises a first vector indicative of the resources used by the first service;

compare the information about resources used by the first service at the current time against baseline information, the baseline information comprising at least information about resources used by at least a second service of the plurality of services at the current time, wherein the baseline information comprises a second vector indicative of the resources used by the second service, and wherein comparing the information against the baseline information comprises comparing the first vector and the second vector;

determine that the first service is in a normal condition when the information about resources used by the first service at the current time has at least a predetermined amount of similarity with the baseline information;

determine that the first service is in an abnormal condition when the information about resources used by the first service at the current time has less than the predetermined amount of similarity with the baseline information; and send an indication of the one or more of the normal condition or the abnormal conditional to cause a change in a configuration of one or more of the plurality of services.

2. The system of claim 1, wherein the at least one memory further bears instructions that, upon execution, cause the system at least to:

determine the predetermined amount of similarity based on a distance between resources used by two services of the plurality of services in a coordinate system.

3. The system of claim 1, wherein the at least one memory further bears instructions that, upon execution, cause the system at least to:

display a graphical indication in a user interface of resources used by two services of the plurality of services in a coordinate system; and receive an indication of user input at the user interface of the predetermined amount of similarity.

4. A method, comprising:

determining information about resources used by a first service of a plurality of services at a current time;

determining that the first service is in a normal condition when the information about resources used by the first service at the current time has at least a predetermined amount of similarity with information about resources used by at least a subset of the plurality of services at the current time;

determining that the first service is in an abnormal condition when the information about resources used by the first service at the current time has less than the predetermined amount of similarity with the information about resources used by at least the subset of the plurality of services at the current time; and sending an indication of the one or more of the normal condition or the abnormal conditional to cause a change in a configuration of one or more of the plurality of services.

5. The method of claim 4, further comprising:

determining the predetermined amount of similarity based on a distance between resources used by a second service of the plurality of services in a coordinate system, and resources used by a third service of the plurality of services in the coordinate system.

6. The method of claim 4, further comprising:

displaying a graphical indication in a user interface of resources used by a second service of the plurality of services, and resources used by a third service of the plurality of services in a coordinate system.

7. The method of claim 6, further comprising:

receiving an indication of user input at the user interface of the predetermined amount of similarity.

8. The method of claim 4, wherein the first service and at least the subset of the plurality of services share an instance type, a hardware type, or a time at which their resources are measured.

9. The method of claim 4, wherein determining that the first service is in the normal condition when the information about resources used by the first service has at least the predetermined amount of similarity with the information about resources used by at least the subset of the plurality of services further comprises:

determining that the first service is in the normal condition when the information about resources used by the service has at least the predetermined amount of similarity with the information about resources used by at least the subset of the plurality of services, or at least the predetermined amount of similarity with information about resources used by at least a second subset of the plurality of services.

10. The method of claim 4, wherein the information about resources used by the first service comprises usage of a processor, a load of the first service, a storage device input/output rate of the first service, an amount of network traffic of the first service, a latency of the first service performing an action, a transfer rate of data associated with the first service, a virtual memory paging associated with the first service, an activity of a thread associated with the first service, or an error associated with the first service.

11. The method of claim 4, wherein the first service is configured to host one or more instances, wherein the information about resources used by the first service indicates a variance of the resources used by the first service, and further comprising:

determining whether to place an instance on the first service based on the variance of the resources used by the first service.

12. The method of claim 4, wherein the information about resources used by the first service comprises information obtained from the first service.

13. The method of claim 4, further comprising:

determining that a predetermined amount of time has elapsed;

determining second information about resources used by the first service after the predetermined amount of time has elapsed;

determining that the first service is in the normal condition after the predetermined amount of time has elapsed when the second information about resources used by the service has at least a predetermined amount of similarity with the information about processing resources used by at least the subset of the plurality of services; and determining that the service is in the abnormal condition after the predetermined amount of time has elapsed when the second information about resources used by the service has less than the predetermined amount of similarity with the information about processing resources used by at least the subset of the plurality of services.

14. The method of claim 4, the information about resources used by the first service comprises an N-dimensional vector, each element of the vector identifying a type and amount of resources used by the first service.

15. A non-transitory computer-readable medium, bearing computer-readable instructions that, when executed on at least one computing node, cause the at least one computing node to perform operations comprising:

determining information about resources used by a first service of a plurality of services at a current time;

determining that the first service is in a normal condition when the information about resources used by the first service at the current time has at least a predetermined amount of similarity with information about processing resources used by at least a subset of the plurality of services at the current time;

determining that the first service is in an abnormal condition when the information about resources used by the first service at the current time has less than the predetermined amount of similarity with the information about processing resources used by at least the subset of the plurality of services at the current time; and sending an indication of the one or more of the normal condition or the abnormal conditional to cause a change in a configuration of one or more of the plurality of services.

16. The non-transitory computer-readable medium of claim 15, further bearing computer-readable instructions that, upon execution on a computing node, cause the computing node to perform operations comprising:

determining the predetermined amount of similarity based on a distance between resources used by a second service of the plurality of services in a coordinate system, and resources used by a third service of the plurality of services in a coordinate system.

17. The non-transitory computer-readable medium of claim 15, further bearing computer-readable instructions that, upon execution on a computing node, cause the computing node to perform operations comprising:

displaying a graphical indication in a user interface of resources used by a second service of the plurality of services, and resources used by a third service of the plurality of services in a coordinate system.

18. The non-transitory computer-readable medium of claim 17, further bearing computer-readable instructions that, upon execution on a computing node, cause the computing node to perform operations comprising:

receiving an indication of user input at the user interface of the predetermined amount of similarity.

19. The non-transitory computer-readable medium of claim 15, wherein the first service and at least the subset of the plurality of services share an instance type, a hardware type, or a time at which their resources are measured.

20. The non-transitory computer-readable medium of claim 15, wherein the instructions that, upon execution on a computing node, cause the computing node to perform operations comprising determining that the first service is in the normal condition when the information about resources used by the first service has at least the predetermined amount of similarity with the information about resources used by at least the subset of the plurality of services further cause the computing node to perform operations comprising:

determining that the first service is in the normal condition when the information about resources used by the service has at least the predetermined amount of similarity with the information about resources used by at least the subset of the plurality of services, or at least the predetermined amount of similarity with information about resources used by at least a second subset of the plurality of services.

21. The non-transitory computer-readable medium of claim 15, wherein the information about resources used by the first service comprises usage of a processor, a load of the first service, a storage device input/output rate of the first service, an amount of network traffic of the first service, a latency of the first service performing an action, a transfer rate of data associated with the first service, a virtual memory paging associated with the first service, an activity of a thread associated with the first service, or an error associated with the first service.

22. The non-transitory computer-readable medium of claim 15, wherein the first service is configured to host one or more instances, wherein the information about resources used by the first service indicates a variance of the resources used by the first service, and further bearing computer-readable instructions that, upon execution on a computing node, cause the computing node to perform operations comprising:

determining whether to place an instance on the first service based on the variance of the resources used by the first service.

23. The non-transitory computer-readable medium of claim 15, wherein the information about resources used by the first service comprises information obtained from a service other than the first service.

24. The non-transitory computer-readable medium of claim 15, further bearing computer-readable instructions that, upon execution on a computing node, cause the computing node to perform operations comprising:

determining that a predetermined amount of time has elapsed;

determining second information about resources used by the first service after the predetermined amount of time has elapsed;

determining that the first service is in the normal condition after the predetermined amount of time has elapsed when the second information about resources used by the service has at least a predetermined amount of similarity with the information about resources used by at least the subset of the plurality of services; and determining that the service is in the abnormal condition after the predetermined amount of time has elapsed when the second information about resources used by the service has less than the predetermined amount of similarity with the information about resources used by at least a second subset of the plurality of services.

* * * * *